Patented Aug. 3, 1943

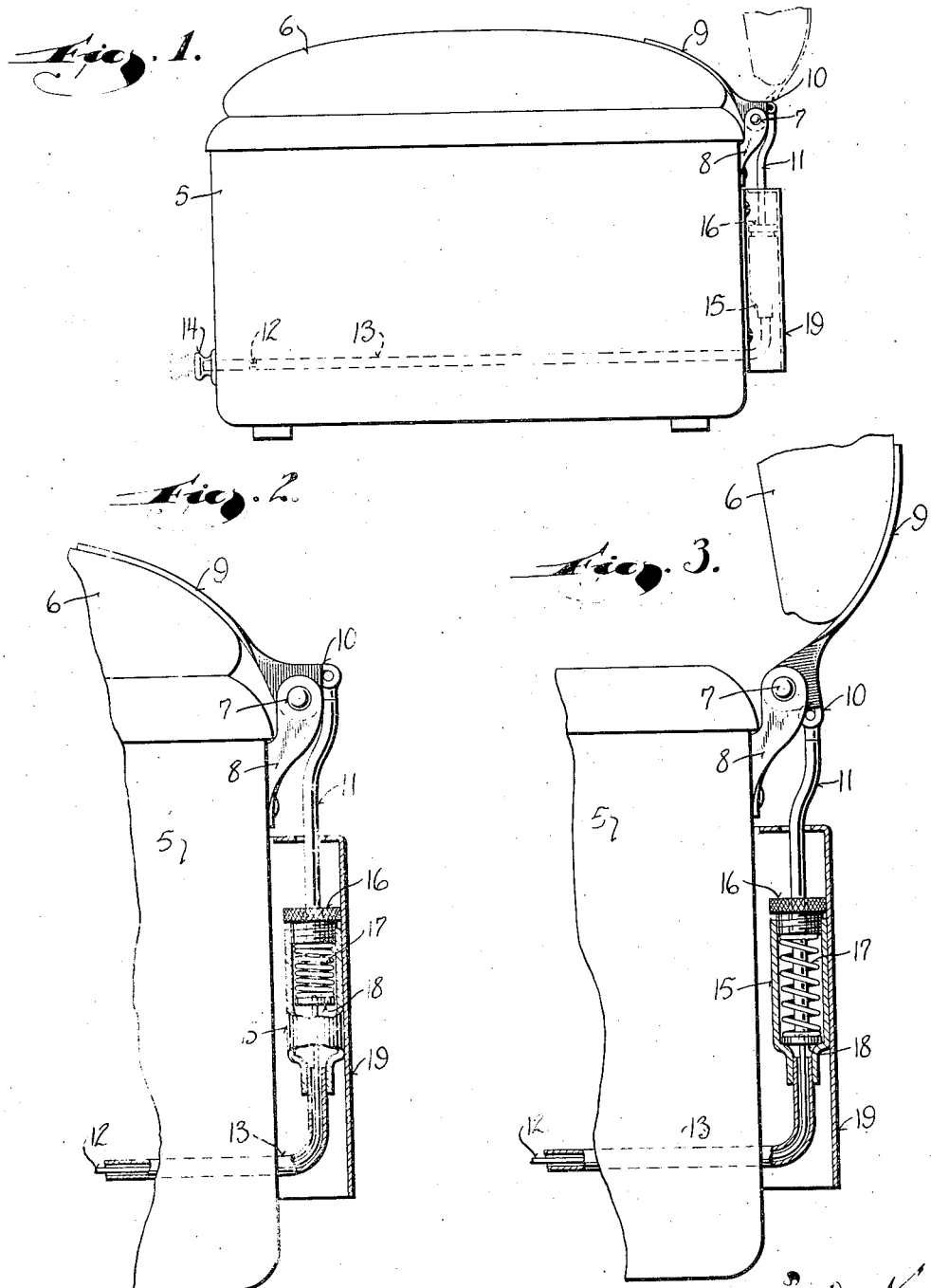

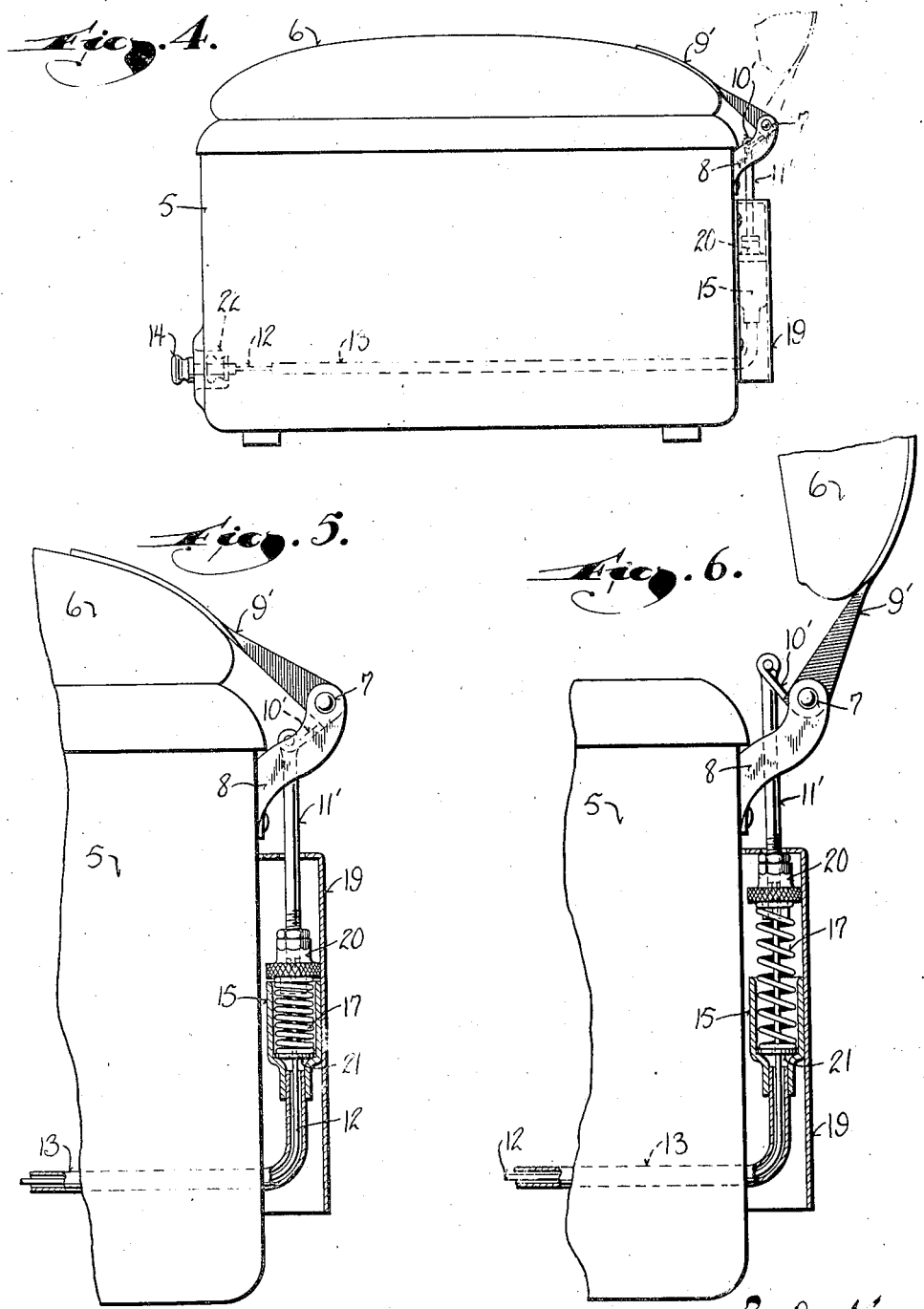

2,325,897

UNITED STATES PATENT OFFICE 2,325,897

COVER OPERATING MEANS FOR COOKING APPLIANCES

Chauncey E. Waltman, Chicago, Ill., assignor to National Enameling & Stamping Company, Milwaukee, Wis., a corporation of New Jersey Application September 16, 1940, Serial No. 357,030

2 Claims. (Cl. 220—36)

This invention relates to cooking appliances or electric roasters as they are more generally known, and has as an object the provision of novel means for opening and closing the cover thereof.

Electric roasters have always been equipped with covers, but originally these covers were merely lids provided with handles to permit them to be directly lifted from or applied to the open top of the body or receptacle of the roaster.

Later the covers were hinged, but no means other than a handle attached to the front portion thereof was provided for lifting or lowering the same. Consequently, the housewife was subjected to the inconvenience and danger of steam escaping from the roaster as the cover was lifted.

This invention therefore proposes the provision of means for raising and lowering the cover of an electric roaster which includes an actuator having a handle portion located at the lower front portion of the roaster body at a point well removed from the danger zone.

This invention also contemplates as one of its objectives the provision of a simple expedient for raising and lowering the cover of an electric roaster which incorporates a counterbalancing spring so that raising and lowering of the cover may be accomplished with a minimum of effort.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate two complete examples of the physical embodiment of the invention constructed in accordance with the best modes so far devised for the practical application of the principles thereof, and in which:

Figure 1 is an end view of an electric roaster equipped with one form of this invention;

Figure 2 is an enlarged view partially in elevation and partially in section looking at the end of the roaster and showing its cover closed;

Figure 3 is a view similar to Figure 2, but showing the cover open;

Figure 4 is a view similar to Figure 1 illustrating a slightly modified embodiment of this invention; and Figures 5 and 6 are views similar to Figures 2 and 3, respectively, but illustrating the construction employed in the modified form of the invention shown in Figure 4.

Referring now particularly to the accompanying drawings in which like numerals indicate like parts, the numeral 5 designates the roaster body, which as is customary, consists of an open topped receptacle having heavily insulated walls. Electric heating elements (not shown) are imbedded in these walls.

The open top of the receptacle is closed by a cover 6 hinged as at 7 from the rear wall of the body or receptacle. The specific manner in which the hinged support for the cover is constructed forms no part of this invention and in both embodiments illustrated comprises merely a bracket 8 fixed to the rear wall of the body and a stamping 9 riveted or otherwise secured to the cover, and hingedly connected to the bracket.

In that form of the invention illustrated in Figures 1, 2 and 3, the stamping 9 has an arm 10 projecting rearwardly beyond the axis of the hinge. Attached to this arm is a link 11 offset to accommodate the bracket 8 and connected at its lower end to a flexible wire 12.

The wire 12 is slidably received in a conduit or tube 13 which extends through the lower portion of the body or receptacle from its front wall out through its rear wall. At its front end, the flexible wire has an actuator in the form of a knob 14 or the like attached thereto so that a push or a pull may be imparted to the wire.

The conduit or sheath 13 in which the wire is slidably received, is of course anchored to the body of the roaster.

The end of the conduit projecting from the rear wall of the receptacle, is bent upwardly and is secured to the lower end of a cylindrical casing 15, the flexible wire passing upwardly into the casing. The open upper end of this cylindrical casing is internally threaded for the reception of a bushing 16 which is bored to permit the passage of the link 11 therethrough.

Inside the casing 15 the lower end of the link 11 is welded or otherwise secured to the adjacent end of the flexible wire 12 so that a push or pull imparted to the wire is directly transmitted to the link 11 to close or open the cover, as will be readily apparent.

The weight of the cover is balanced by a compression spring 17 coiled about the link 11 inside the casing 15 and confined between the lower end of the bushing 16 and a collar 18 fixed to the extreme lower end of the link at its point of attachment to the flexible wire.

The spring 17 is loaded by adjustment of the bushing 16 to an extent necessary to properly balance the weight of the cover.

In addition to cooperating with the bushing 16, the collar 18 on the lower extremity of the link, through its engagement with the bottom of the cylindrical casing 15, also defines the raised position of the cover as clearly shown in Figure 3.

For the sake of appearance a housing 19, attached to the rear wall of the roaster, covers the casing 15 and the adjacent portion of the sheath or conduit.

In that form of the invention just described, opening of the cover is effected by a pull on the flexible wire. The same results can also be effectively obtained by reversing this order, that is by having the cover open in response to a push on the actuator knob so that the opening of the cover may be said to be effected by the depression of a push button.

Figures 4, 5 and 6 illustrate this adaptation of the invention.

In its essentials, this embodiment is identical to that described, but to accommodate the reversed order of cover opening motion, the stamping 9' has an arm 10' projecting inwardly from the hinge axis toward the body of the receptacle.

The specific construction of the connection between the link 11', by which the cover is connected to the flexible wire 12, is also slightly different. In this case the lower end of the link 11' is threaded to adjustably receive a collar 20 against which one end of the spring 17 bears.

The spring in this instance merely encircles the adjacent end of the flexible wire and its lower end is seated on a washer 21 resting on the bottom of the cylindrical casing 15.

With this construction, a push on the actuator knob 14 opens the cover, which is effected by the force of the compressed spring. Closure of the cover results from the application of a slight pull on the knob.

It is preferable in this instance to provide a well 22 in the front wall of the body or receptacle into which the knob or push button 14 is depressed during opening of the cover. It is to be understood, however, that this well 22 extends laterally in a horizontal plane sufficiently beyond the sides of the knob to allow the same to be grasped.

As in the embodiment previously described, the casing 15 and its associated parts mounted on the back wall of the receptacle are concealed from view by a housing 19; but in this instance, the top wall of the housing constitutes the abutment against which the collar 20 on the link 11' engages, as shown in Figure 6, to define the open position of the cover.

From the foregoing description, taken in connection with the accompanying drawings, it will be readily apparent that this invention provides a simple expedient for opening and closing the hinged cover of an electric roaster by which all danger of escaping steam striking the hand or arm of the housewife is eliminated.

What I claim as my invention is:

1. In a cooking appliance having an open topped receptacle and a cover hinged to the rear wall thereof: a part connected with the cover and projecting radially from the hinge axis; a link having one end connected to said part and having its other end overlying the rear wall of the receptacle; a cylindrical casing fixed to the rear wall of the receptacle and encircling said other end of the link; a conduit leading from the lower end of said casing to the front wall of the receptacle; a flexible wire slidable in said conduit and having an end portion extending into the cylindrical casing; an actuator connected with the wire adjacent to the front wall of the receptacle so as to be accessible at said front wall for the application of a push or pull on the wire; means connecting said end portion of the wire with said other end of the link; a cover counterbalancing compression spring inside the casing to be guided thereby; cooperating abutments on the link and casing between which said spring is confined under a degree of compression; and means for adjusting one of said abutments so that the expansive force of the spring may be regulated to substantially balance the weight of the cover, said last named means enabling adjustment of said abutment independently of the connection between the link and wire.

2. In a cooking appliance of the type wherein an open topped receptacle is provided with a cover hinged to the rear wall thereof and wherein the cover has a part projecting radially from its hinge axis: a link having one end connected to said cover part and having its other end overlying the rear wall of the receptacle; a casing fixed with relation to the rear wall of the receptacle and into which said other end of the link projects; a conduit leading from the lower end of said casing to the front wall of the receptacle; a flexible wire slidable in said conduit and having an end portion projecting into the casing; an actuator connected with the wire adjacent to the front wall of the receptacle so as to be accessible at said front wall for the application of a push or pull on the wire; a connection between said end portion of the wire and said other end of the link; a cover counterbalancing spring inside the casing; and spaced cooperating abutments on the link and casing for loading the spring, one of said abutments being adjustable to render the counterbalancing force of the spring substantially equal to the weight of the cover, and the link carried abutment being engageable with a part fixed with relation to the casing during lifting of the cover to define the open position of the cover.

CHAUNCEY E. WALTMAN.